Feb. 14, 1933. W. COLE 1,897,301
CUTTING-OFF MECHANISM IN CIGARETTE MAKING AND SIMILAR MACHINES, WHEREIN
THE ROD OR THE LIKE IS MOVING CONTINUOUSLY IN A LENGTHWISE DIRECTION
Filed June 29, 1926    5 Sheets-Sheet 2
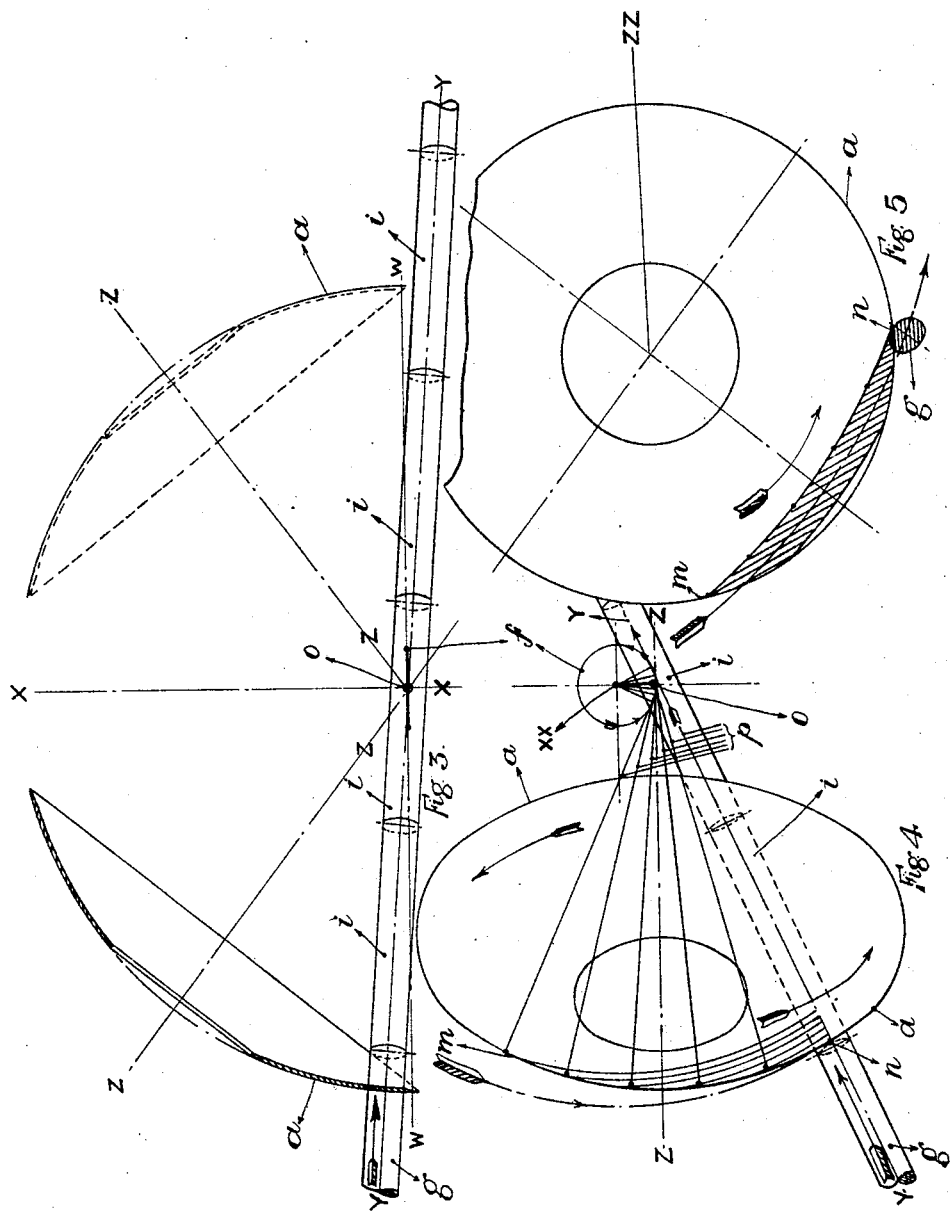
Inventor
WILLIAM COLE,
By Toulmin & Toulmin,
Attorneys

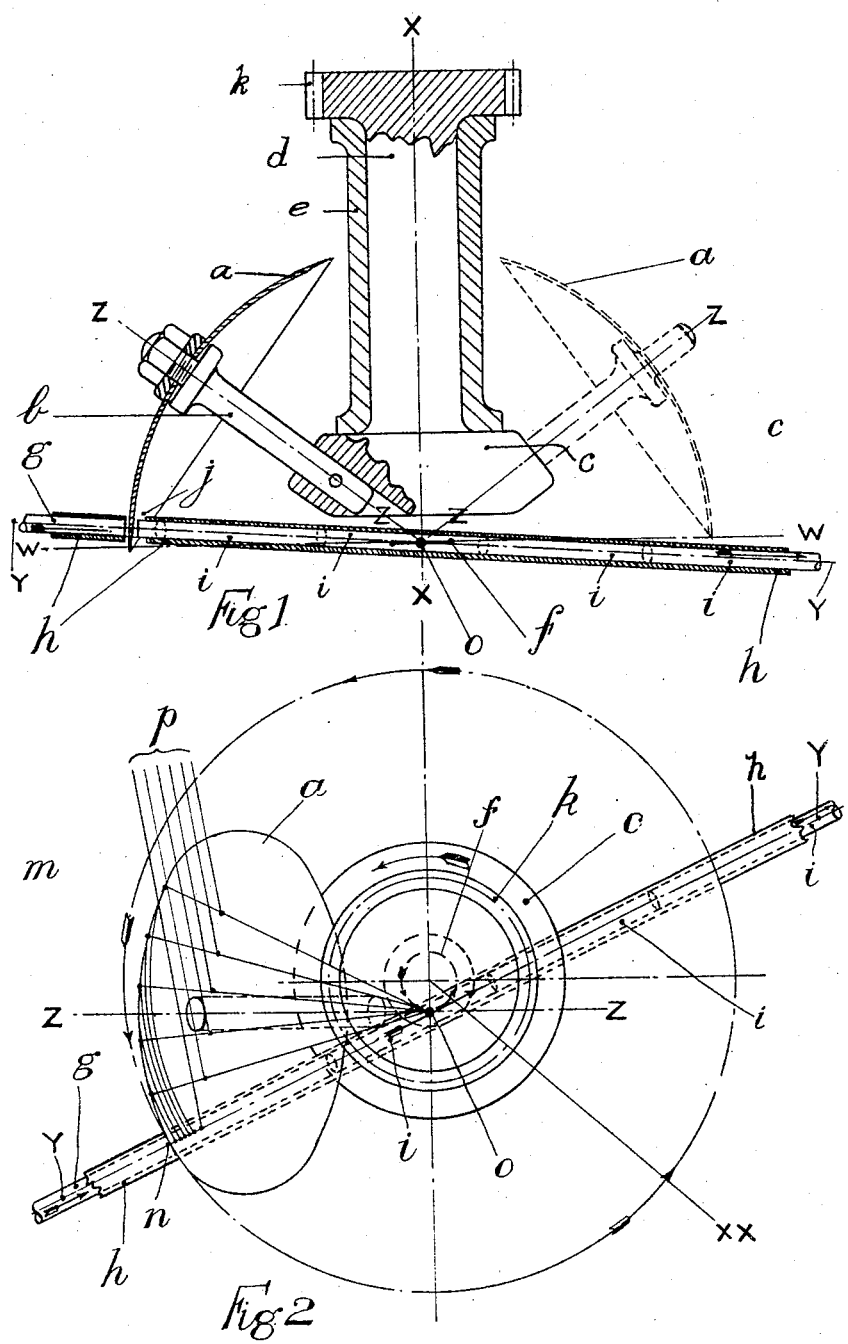

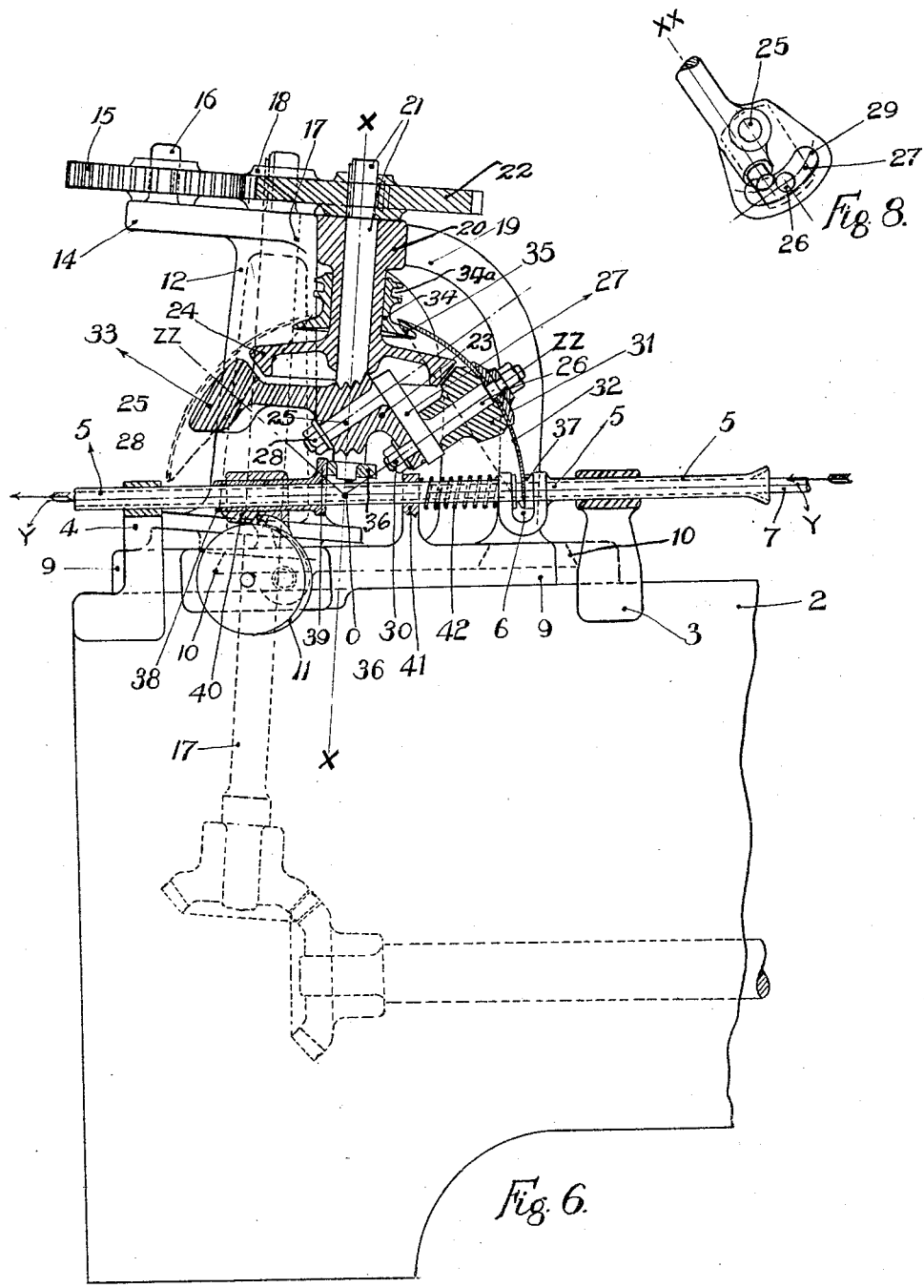

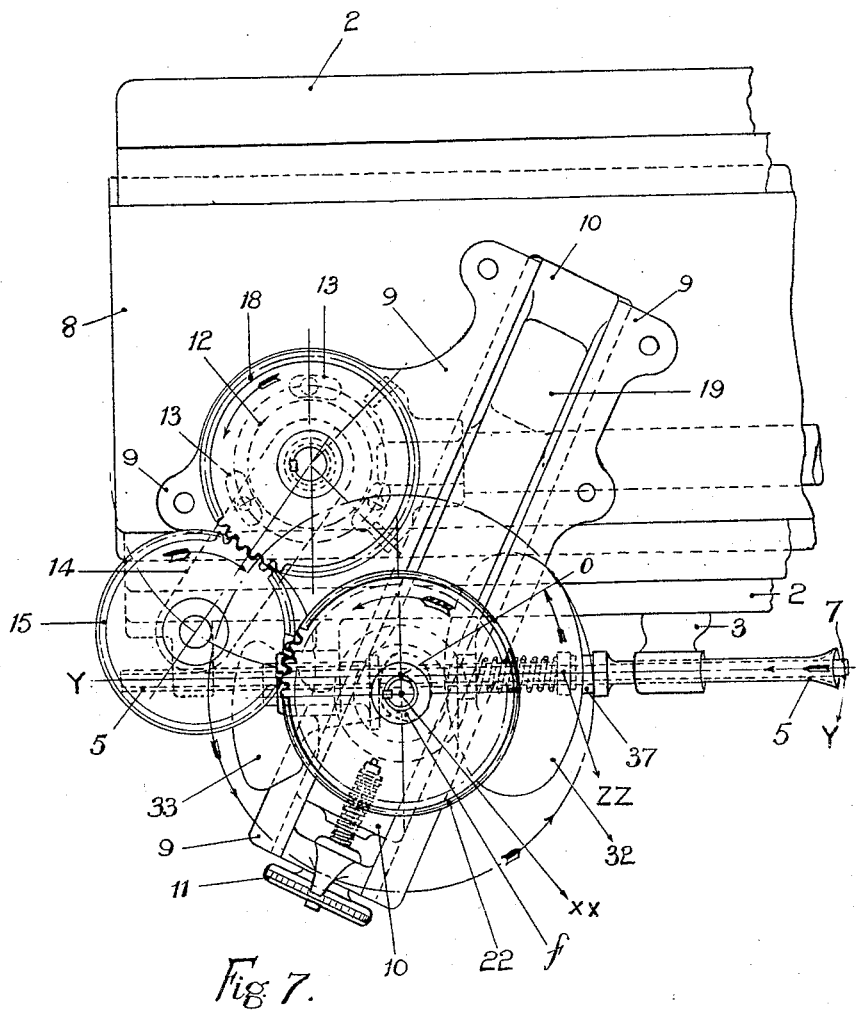

WILLIAM COLE, Inventor

Patented Feb. 14, 1933

1,897,301

UNITED STATES PATENT OFFICE

WILLIAM COLE, OF BRISTOL, ENGLAND, ASSIGNOR TO THE BARON CIGARETTE MACHINERY COMPANY LIMITED, OF LONDON, ENGLAND, A CORPORATION OF GREAT BRITAIN

CUTTING-OFF MECHANISM IN CIGARETTE MAKING AND SIMILAR MACHINES, WHEREIN THE ROD OR THE LIKE IS MOVING CONTINUOUSLY IN A LENGTHWISE DIRECTION

Application filed June 29, 1926, Serial No. 119,444, and in Great Britain July 31, 1925.

This invention relates to cutting off mechanisms in cigarette making and similar machines of the type in which a continuous rod of the material to be cut is moved continuously and uniformly in a lengthwise direction.

The object of this invention is to provide an improved cutting-off mechanism of this type.

A cutting-off mechanism made according to the present invention comprises in combination a rotor mounted to rotate about a fixed axis and a cutter which is free from oscillation mounted on said rotor adapted to intersect the rod during the cutting action, said cutter having a section of involute or substantially involute curvature on a plane normal to the said fixed axis, the said involute being described around the fixed axis of the rotor. The plane of intersection is taken through any point of contact between the cutter and the rod. A convenient form of cutter closely approximating to the desired involute curve may, for example, take the form of a portion of the surface of a sphere, cylinder, or cone. In the case of a cutter made from a portion of the surface of a sphere the cutter is located in the mechanism so that the centre of spherical dishing hereinafter referred to as the point "O" traces the base circle of the said involute curve about the axis of bodily revolution, the axis of said cutter lies in a plane parallel to the axis of bodily revolution, which plane is approximately tangential to the base circle; said cutter cuts the plane of the base circle, and the axis of the rod to be cut is slightly inclined to the plane of the base circle, so that the cutter intersects the path of the rod once only for each bodily revolution in order to sever the rod. The axis of the rod lies in a plane parallel to the axis of bodily revolution of the cutter which plane is also approximately tangential to the base circle. The axis of the rod is positioned so that during the complete period of cutting and contact between said cutter and rod, the centre of spherical dishing "O" is located and travels as closely as possible in and along the axis of the rod, in approximately the same direction and at approximately the same speed as the linear movement of the rod, and the surface of the cutter in contact with the cut ends travels equally and uniformly with the linear movement of the rod.

In the case of a cutter formed by a portion of the surface of a cylinder or cone the axis of curvature, being the equivalent of the centre of spherical dishing "O", of the sphere, must cut the circumference of the base circle, but in all other respects the arrangement of the mechanism is similar.

Means are or may be provided to vary the relative positions of the axis of formation of the cutter and the axis of bodily revolution of the cutter so as to vary the diameter and circumference of the base circle.

Where the rod is moved continuously and at a uniform speed, and one cutter only is employed, the circumference of the said base circle is equal to the length of pieces of rod required to be cut off.

Where the cutter is rotated on its axis the zone of contact across the surface of cutter is lengthened or shortened according to the direction of rotation.

If it is desired to alter the length of the pieces cut off, for instance to double the length without altering the number of cutters employed or the rate of feed of the rod, it will be necessary to double the circumference of the base circle, and consequently to halve the number of bodily revolutions per minute of the cutter about the axis of bodily revolution so as to maintain the specified conditions.

The cutter may be rotated about its own axis of formation or not and may be a complete circular disc, or a portion thereof, or may be of any shape provided the zone of contact complies with the specified conditions. The edge of the cutter may be sharp or serrated. Any convenient number of cutters may be employed, being disposed about the axis of bodily revolution as desired.

The rod to be cut may be supported in a tube which may be reciprocated along its axis, or not, and the tube may be furnished with a ledger plate over which the edge, or edge and portion of the surface of the cutter sweeps when severing the rod.

Means are or may be provided for sharpening the cutter, and the sharpener may be in the form of a wheel or disc and this may be revolved or not; in some cases the sharpening of the cutter may be effected by wiping a burred edge thereon instead of by abrasion. If a wheel or disc sharpener is used the wheel or disc may be complete or segmental. If the sharpener is a complete disc formed about the axis of bodily revolution, it may be rotated about the axis of bodily revolution or not, but if segmental the sharpener must be rotated about the axis of bodily revolution whilst sharpening.

Referring to the drawings filed herewith:—

Fig. 1 is a diagrammatic part sectional elevation of one form of mechanism made in accordance with the invention, in which the dished cutter does not rotate about its axis and is adapted to cut off a predetermined length.

Fig. 2 is a plan of Fig. 1.

Fig. 3 is a diagrammatic sectional elevation of the spherical dished cutter shown in Fig. 1 on an enlarged scale to show the method of designing and locating the cutter.

Fig. 4 is a plan of Fig. 3.

Fig. 5 is a plan of the dished cutter viewed along the axis ZZ.

Fig. 6 is a part sectional elevation of a cutting off mechanism made in accordance with this invention and applied to a cigarette making machine of a common type embodying one method of making adjustments for varying the length of cigarette cut off, a cutter rotated about its own axis of formation, means for sharpening the cutter and a reciprocating supporting tube and ledger plate.

Fig. 7 is a plan of Fig. 6 viewed along axis XX.

Fig. 8 is a plan of the cranked member and locating quadrant.

Figure 9:
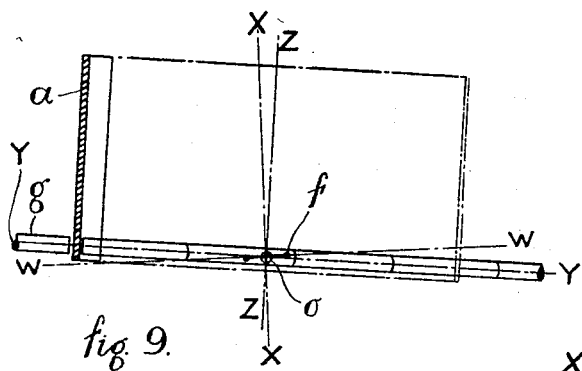
Fig. 9 is a diagram showing the application of a cutter, formed as a portion of the surface of a cylinder constructed about the axis ZZ.

Referring again to Figs. 1 and 2, see also Figs. 3, 4 and 5 for geometrical diagrams, $a$ is a spherically dished circular cutter mounted on the spindle $b$ secured in the boss $c$ so that the cutter does not rotate about the axis ZZ of the spindle $b$. The boss $c$ is formed on a shaft $d$ journalled in the bearing $e$ and adapted to rotate about the axis of bodily revolution XX. The cutter $a$ is located so that the centre of spherical dishing "O" traces the base circle $f$ about the axis of bodily revolution XX. The axis ZZ lies in a plane parallel to the axis XX which plane is tangential to the base circle $f$. The cutter $a$ cuts the plane WW of the base circle $f$. The rod $g$ to be cut is slightly inclined to the plane of the base circle $f$ and the axis YY of the rod $g$ is positioned so that during the complete period of cutting and contact between the cutter $a$ and the rod $g$ the path of the point "O" nearly coincides with the axis YY. The direction of bodily revolution of the cutter and the direction of axial movement of the rod is shown by arrows. The length of rod $i$ cut off is equal to the circumference of the base circle $f$. The rod $g$ is supported in a tube $h$ which is formed with a gap $j$. In operation during the period of cutting and contact the rod $g$ is moved axially at the same speed as the peripheral speed of the point "O" and in the same direction as shown by the arrow. The cutter sweeps through the gap $j$ and severs the rod $g$. The cutter is shown in dotted lines in Figs. 1 and 3 in a position nearly diametrically opposite the gap, and it will be seen that it passes above and clear of the tube $h$. The rod $g$ is shown cut into short lengths $i$. The shaft $d$ is provided with a spur gear $k$ by which it may be driven.

Referring to Figs. 3, 4 and 5. Figs. 3 and 4 show the spherically dished cutter $a$ and rod $g$ in the same relative position as shewn in Figs. 1 and 2. The shaded portion in Fig. 5 represents the zone of contact of the cutter with the end of the rod $g$ and extends from $n$ to $m$ as shown in Figs. 4 and 5. In Fig. 4 viewed along axis XX this portion of the spherical cutter approximates to an involute curve (marked by circular dots) traced by a fixed point in the straight line $p$ which is rolled tangentially without slipping upon the base or generating circle $f$. The point "O" is the centre of dishing of the cutter $a$.

It will be seen in Fig. 3 and Fig. 4 that while the cutter is passing through the rod $g$, the path of the point "O" travels approximately along the axis YY of the rod $g$ consequently the spherical dished cutter cuts the rod $g$ substantially square at the ends, the severed ends being slightly convex and concave respectively matching the inner and outer spherical surfaces of the dished cutter. The circumference of the base circle $f$ is equal to the length of the pieces of rod $i$ cut off.

Figs. 1 to 5 shew a mechanism designed to employ one cutter but where more than one cutter is employed the circumference of the base circle $f$ must still be equal to the total length of rod fed for each complete bodily revolution of each cutter about XX.

Referring to Figs. 6 and 7. On the bed plate 2 of the machine are brackets 3 and 4 in which is slidably supported a supporting tube 5 for cigarette rod 7. The tube 5 is formed with a U shaped gap 6. The cigarette rod 7 passes through the tube 5 in the direction shewn by the arrow.

On the bed-plate of the machine is mounted a short sliding bed 8 Fig. 7 such as is found in many cigarette making machines. On the short sliding bed 8 is secured a saddle 9 formed with a V bed on which is mounted a slide 10 slidably moved in the usual manner by turning the hand wheel 11 attached to a screw.

On the saddle 9 is bolted a pillar 12 the base of which is provided with curved slots 13 through which securing bolts pass and thus enable the pillar to be adjusted by swinging about its axis. The pillar 12 is formed with an arm 14 carrying a spur gear 15 rotatably mounted on the stud 16 and free to rotate thereon. Journalled in the pillar 12 is a driving shaft 17 having a spur gear 18 to mesh with the spur gear 15. The slide 10 is formed with a bracket 19 which carries the cutter mechanism about to be described. The bracket 19 is shaped with a head 20 which forms a journal for the inclined shaft 21 having at its upper end a spur gear 22 to mesh with the spur gear 15 and at its lower end a boss 23. The lower end of the head 20 is formed as a fulcrum friction cone 24. Carried by the boss 23 is a cranked member formed by the crank pins 25 and 26 and the web 27, the crank pin 25 being secured in the boss 23 by a nut 28. The boss 23 is formed with a flat locating surface on which the web 27 rests and an extension of the crank pin 26 passes through a curved quadrant slot 29 Fig. 8 in the locating face and a nut 30 on the end thereof locks the web 27 against movement on the locating face. The crank pin 26 carries a friction cone 31 free to rotate thereon and to which is secured the circular dished cutter 32. The friction cone 31 contacts with and rolls upon and around the fulcrum friction cone 24. The boss 23 is also provided with a counter balance weight 33. On the head 20 and coaxial with the inclined shaft 21 is mounted a slidable sleeve 34 free to rotate thereon carrying a circular or segmental abrasive surface 35 forming a sharpener adapted to be slidden axially on the head 20. The abrasive surface 35 is mushroom shaped and is formed as a surface of revolution about a central axis herein referred to as "the axis of formation" which in the present case coincides with the axis X—X which is fixed in relation to the fixed path described by the cutter. The sleeve 34 is adapted to be slidden in any well-known manner to engage the under surface of the circular dished cutter 32 to sharpen the cutting edge, the upper end of the slidable sleeve 34 being formed with a groove 34a adapted to be engaged by a yoke or other mechanism (not shown) by which the sleeve 34 may be operated on the head 20. The lower end of the inclined shaft 21 is provided with a cam 36. The crank pin 25 is preferably off-set from the axis X—X of the inclined shaft 21 and inclined at an angle thereto and the amount of off-set of the crank pin 26 can be adjusted by swinging the crank pin 26 about the crank pin 25. This varies the diameter of the base circle referred to as the base circle $f$ in Figs. 1 to 5. The cutter in bodily revolving about the axis X—X of the inclined shaft 21 sweeps through the gap 6 in the cigarette supporting tube 5 and cuts off the cigarette rod against the face of a ledger plate 37 disposed on the supporting tube 5.

The cigarette supporting tube 5 is provided with a sleeve 38 secured thereto formed with a cam tappet 39 which is operated by the cam 36. A supporting bracket 40 mounted on the saddle 9, provides a sliding support to the sleeve 38, and a second bracket 41, also mounted on the saddle 9, serves as a stop for a coil spring 42 positioned on the cigarette supporting tube 5 between the bracket 41 and the U shaped gap in the said supporting tube.

The cam 36 imparts an axial movement to the supporting tube 5 so that the tube moves at approximately the same speed as the cigarette rod at the time when the cutter is passing through the gap.

If it is desired to operate the mechanism with a stationary ledger plate as previously suggested in the specification, the cam 36 is removed from the inclined shaft 21 so that the tube 5 is no longer reciprocated. Means may be provided (not shown) for locking the tube in position. In this case the working surface of the ledger plate 37 must have its working surface formed to match the surface of revolution described by the cutting edge about the axis X—X. In the case of the reciprocating ledger plate the working surface of the ledger plate must be a matrix of the cutter with which it coincides.

In operation assuming that the axis ZZ of the dished cutter 32 has been set by adjustment of the cranked members 25, 26 and 27 and that the slide 10 has been set by the hand wheel 11 to position the axis X—X and the dished cutter 32 correctly with respect to the supporting tube 5 to cut cigarettes squarely and of the desired length, in accordance with the principles set forth with reference to Figs. 1 and 2, 3, 4, and 5, and that the relative speed of the bodily revolution about X—X of the cutter has been correctly arranged by selecting suitable gears, the spindle 17 being driven in a suitable manner, the drive is transmitted through the spur gears 18, 15 and 22 to revolve the boss 23 and the dished cutter 32 about the axis X—X of the spindle 21. The friction zone 31 rolling round the fulcrum friction cone 24 causes the dished cutter to rotate about the axis ZZ of the crank pin 26. The dished cutter 32 passes through the gap 6 in the supporting tube 5 sweeping over the surface of the ledger plate 37 once in every revolution about the axis XX and in doing so severs the cigarette rod 7 into pieces of the predetermined length. As already explained with reference to Figs. 1, 2, 3, 4 and 5, the surface of the dished cutter 32 in contact with the cigarette rod while severing the same has a movement along the axis of the rod approximating very closely to the axial feed of the cigarette rod and the supporting tube 5 is synchronously moved by the cam 36 acting on the cam tappet 39, the spring 42 causing the cam tappet 39 to follow the contour of the cam 36, thus imparting the desired reciprocating movement to the tube 5.

The speed of the shaft 21 about which the dished circular cutter 32 bodily revolves can be varied by changing the spur gear 22 for one of a different size, and in order to bring the spur gear 15 correctly into mesh with the spur gear 22, the pillar 12 is adjusted about its axis.

Referring to Fig. 9, the cutter $a$ is formed as a portion of the surface of a cylinder and the portion used in cutting and contact approximates to the contact surface of the spherical cutter shown in Fig. 3.

Figure 10:
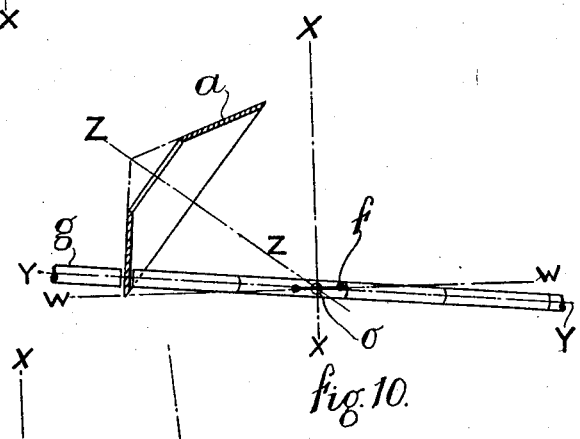
Fig. 10 is a diagram showing the application of a cutter formed as a portion of the surface of a cone constructed about the axis ZZ.
Figure 11:
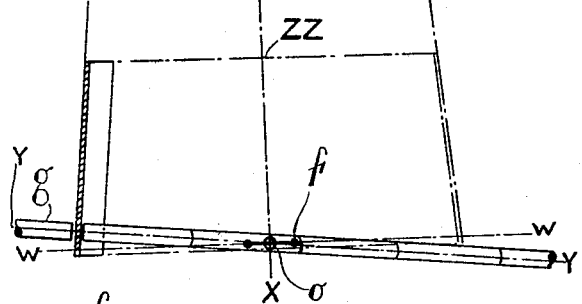
Fig. 11 is a diagram showing a further application of a cutter formed as a portion of the surface of a cone constructed about the axis ZZ.

Referring to Figs. 10 and 11, the cutter $a$ is formed as a portion of the surface of a cone and the portion used in cutting and contact approximates to the contact surface of the spherical cutter shown in Fig. 3.

When it is desired to sharpen the dished cutter 32 Fig. 6 this can be effected while the machine and cutting-off mechanism is in operation by raising the sleeve 34 so as to bring the surface 35 into contact with the dished cutter.

It is understood that any convenient materials, forms of construction and methods of adjusting, mounting, driving and applying the mechanisms described and claimed hereinbefore may be utilized as desired, to substantially comply with the specified conditions characterizing the formation and arrangement of the cutter mechanism.

What I claim and desire to secure by Letters Patent is:—

1. In a machine for cutting a continuously moving cigarette rod, cutting mechanism comprising in combination a rotor mounted to rotate about a fixed axis and a cutter mounted on said rotor adapted to intersect the rod during the cutting action, said cutter having a section of substantially involute curvature on a plane normal to the said fixed axis.

2. In a machine for cutting a continuously moving cigarette rod, cutting mechanism comprising in combination a rotor mounted to rotate about a fixed axis and a cutter mounted on said rotor adapted to intersect the rod during the cutting action, said cutter having a curvilinear section closely approximating that of an involute curve on a plane normal to the said fixed axis, the surface of the cutter constituting a portion of a surface of revolution about an axis of formation.

3. In a machine for cutting a continuously moving cigarette rod, cutting mechanism comprising in combination a rotor mounted to rotate about a fixed axis and a cutter mounted on said rotor adapted to intersect the rod during the cutting action, said cutter having a curvilinear section closely approximating that of an involute curve on a plane normal to the said fixed axis, the surface of the cutter constituting a portion of a sphere.

4. In a machine for cutting a continuously moving cigarette rod, a cutting mechanism comprising a cutter moving in a fixed path in combination with a sharpener having an axis of formation which is fixed relatively to the said fixed path.

5. In a machine for cutting a continuously moving cigarette rod, cutting mechanism comprising a rotor mounted to rotate about a fixed axis and a cutter for cutting the cigarette rod mounted on said rotor in combination with a sharpener for sharpening the cutter having an axis of formation which is fixed relatively to the said fixed axis of the rotor.

6. In a machine for cutting a continuously moving cigarette rod, cutting mechanism comprising a rotor mounted to rotate about a fixed axis and a cutter for cutting the cigarette rod mounted on said rotor in combination with a sharpener for sharpening the cutter having an axis of formation which is fixed relatively to the said fixed axis of the rotor, and a grooved member incorporated with the said sharpener by means of which the said sharpener can be moved axially.

7. In a machine for cutting a continuously moving cigarette rod, cutting mechanism comprising a rotor mounted to rotate about a fixed axis and a cutter for cutting the cigarette rod mounted on said rotor in combination with a sharpener for sharpening the cutter having an axis of formation which is fixed relatively to the said fixed axis of the rotor, and around which the sharpener is capable of rotation.

8. In a machine for cutting a continuously moving cigarette rod, cutting mechanism comprising a rotor mounted to rotate about a fixed axis and a cutter for cutting the cigarette rod mounted on said rotor in combination with a sharpener for sharpening the cutter having an axis of formation which is fixed relatively to the said fixed axis of the rotor, and around which the sharpener is capable of rotation, and a grooved member incorporated with the said sharpener by means of which the said sharpener can be moved axially.

9. In a machine for cutting a continuously moving cigarette rod, cutting mechanism comprising in combination a rotor mounted to rotate about a fixed axis and a cutter mounted on said rotor adapted to intersect the rod during the cutting action, said cutter having a section of involute curvature on a plane normal to the said fixed axis together with a sharpener having an axis of formation which is fixed relatively to the said fixed axis of the rotor.

10. In a machine for cutting a continuously moving cigarette rod, cutting mechanism comprising in combination a rotor mounted to rotate about a fixed axis and a cutter mounted on said rotor adapted to intersect the rod during the cutting action, said cutter having a section of involute curvature on a plane normal to the said fixed axis together with a sharpener having an axis of formation which is fixed relatively to the said fixed axis of the rotor, and a grooved member incorporated with the said sharpener by means of which the said sharpener can be moved axially.

11. In a machine for cutting a continuously moving cigarette rod, cutting mechanism comprising in combination a rotor mounted to rotate about a fixed axis and a cutter mounted on said rotor adapted to intersect the rod during the cutting action, said cutter having a section to involute curvature on a plane normal to the said fixed axis together with a sharpener having an axis of formation which is fixed relatively to the said fixed axis of the rotor, and around which the sharpener is capable of rotation.

12. In a machine for cutting a continuously moving cigarette rod, cutting mechanism comprising in combination a rotor mounted to rotate about a fixed axis and a cutter mounted on said rotor adapted to intersect the rod during the cutting action, said cutter having a section of involute curvature on a plane normal to the said fixed axis together with a sharpener having an axis of formation which is fixed relatively to the said fixed axis of the rotor, and around which the sharpener is capable of rotation, and a grooved member incorporated with the said sharpener by means of which the said sharpener can be moved axially.

13. In a machine for cutting a continuously moving cigarette rod, cutting mechanism comprising in combination a rotor mounted to rotate about a fixed axis and a cutter mounted on said rotor adapted to intersect the rod during the cutting action, said cutter having a section of substantially involute curvature on a plane normal to the said fixed axis, in combination with a ledger plate having a working surface formed to coincide with the surface of revolution described by the cutting edge.

14. In a machine for cutting a continuously moving cigarette rod, cutting mechanism comprising in combination a rotor mounted to rotate about a fixed axis and a cutter mounted on said rotor adapted to intersect the rod during the cutting action, said cutter having a section of substantially involute curvature on a plane normal to the said fixed axis, in combination with an oscillating ledger plate having a working surface formed as a matrix of the cutter surface with which it co-acts.

15. In a machine for cutting a continuously moving cigarette rod, cutting mechanism comprising in combination a rotor mounted to rotate about a fixed axis and a cutter mounted on said rotor adapted to intersect the rod during the cutting action, said cutter having a section of involute curvature on a plane normal to the said fixed axis, and means for varying the position of the cutter in relation to the fixed axis of the rotor according to the length of cigarette to be cut.

16. In a machine for cutting a continuously moving cigarette rod, cutting mechanism comprising in combination a rotor mounted to rotate about a fixed axis and a cutter mounted on said rotor adapted to intersect the rod during the cutting action, said cutter having a curvilinear section closely approximating that of an involute curve on a plane normal to the said fixed axis, the surface of the cutter constituting a portion of a surface of revolution about an axis of formation, in combination with means for varying the position of the axis of formation in relation to the fixed axis of the rotor.

17. In a machine for cutting a continuously moving cigarette rod, a rotatable spindle, a boss fixed on said spindle, a cutter having a section of approximately involute curvature on a plane normal to the axis of the said spindle so that the cutter progresses uniformly with the rod during the cutting action, a support carried on the boss on which the cutter is adjustably mounted, and a ledger plate to co-act with the cutter.

18. In a machine according to claim 17, said cutter having an axis of formation offset relatively to the axis of the said spindle, the degree of offset being varied by adjusting the cutter support on the boss.

In testimony whereof, I affix my signature.
WILLIAM COLE.